(12) United States Patent
Nomura et al.

(10) Patent No.: US 10,877,135 B2
(45) Date of Patent: Dec. 29, 2020

(54) OBJECT DETECTION APPARATUS AND OBJECT DETECTING METHOD

(71) Applicant: DENSO CORPORATION, Kariya (JP)

(72) Inventors: Takuya Nomura, Kariya (JP); Mitsuyasu Matsuura, Nisshin (JP); Taketo Harada, Nisshin (JP)

(73) Assignee: DENSO CORPORATION, Kariya (JP)

( * ) Notice: Subject to any disclaimer, the term of this patent is extended or adjusted under 35 U.S.C. 154(b) by 268 days.

(21) Appl. No.: 15/778,027

(22) PCT Filed: Nov. 21, 2016

(86) PCT No.: PCT/JP2016/084376
§ 371 (c)(1),
(2) Date: May 22, 2018

(87) PCT Pub. No.: WO2017/090546
PCT Pub. Date: Jun. 1, 2017

(65) Prior Publication Data
US 2018/0329044 A1    Nov. 15, 2018

(30) Foreign Application Priority Data
Nov. 24, 2015 (JP) .................................. 2015-229149

(51) Int. Cl.
*G01S 7/52* (2006.01)
*G01S 15/931* (2020.01)
(Continued)

(52) U.S. Cl.
CPC .......... *G01S 7/52006* (2013.01); *G01S 7/521* (2013.01); *G01S 7/524* (2013.01); *G01S 7/526* (2013.01);
(Continued)

(58) Field of Classification Search
CPC .. G01S 7/52004; G01S 7/52006; G01S 15/87; G01S 15/931; G01S 2007/52007; G01S 7/521; G01S 7/524; G01S 7/526
See application file for complete search history.

(56) References Cited

U.S. PATENT DOCUMENTS 4,581,726 A * 4/1986 Makino ............... G01S 7/52004
267/99
5,531,118 A * 7/1996 Knoll .................... B60Q 9/008
73/628

(Continued)

FOREIGN PATENT DOCUMENTS

| JP | 58-189571 A | 11/1983 |
|---|---|---|
| JP | 2005-121509 A | 5/2005 |

(Continued)

*Primary Examiner* — Peter M Bythrow
(74) *Attorney, Agent, or Firm* — Maschoff Brennan (57) ABSTRACT

An object detection apparatus includes an object detecting unit detecting an object present around a subject vehicle based on received waves, in a case of receiving reflected waves, from the object, of ultrasonic waves transmitted from an ultrasonic sensor as transmitted waves. The object detection apparatus includes a temperature sensor detecting a temperature of the ultrasonic sensor, and based on a detected value of the temperature of the ultrasonic sensor, corrects at least one of a reception sensitivity for the received waves received by the ultrasonic sensor and a transmission intensity for the transmitted waves from the ultrasonic sensor. The object detection apparatus then detects the object using the corrected received waves.

12 Claims, 4 Drawing Sheets

(51) Int. Cl.
  *G01S 15/87* (2006.01)
  *G01S 7/526* (2006.01)
  *G01S 7/521* (2006.01)
  *G01S 7/524* (2006.01)

(52) U.S. Cl.
  CPC ............ *G01S 15/87* (2013.01); *G01S 15/931* (2013.01); *G01S 2007/52007* (2013.01); *G01S 2015/938* (2013.01)

(56) References Cited

U.S. PATENT DOCUMENTS

| | | | | |
|---|---|---|---|---|
| 2003/0142587 A1* | 7/2003 | Zeitzew | ............... | G01S 15/74 367/127 |
| 2009/0071255 A1* | 3/2009 | Okuda | ............... | G01S 7/52004 73/628 |
| 2010/0024557 A1* | 2/2010 | Matsuura | ............... | G01S 15/42 73/627 |
| 2010/0220551 A1* | 9/2010 | Akiyama | ............... | G01S 7/539 367/99 |
| 2014/0039750 A1* | 2/2014 | Yopp | ............... | G01S 7/52006 701/33.1 |
| 2014/0039755 A1* | 2/2014 | Yopp | ............... | G01S 7/527 701/36 |
| 2014/0070943 A1* | 3/2014 | Breed | ............... | B60R 21/01516 340/539.11 |
| 2014/0148992 A1* | 5/2014 | Shaffer | ............... | F02D 29/00 701/33.7 |
| 2015/0268335 A1* | 9/2015 | Nakano | ............... | G01S 15/08 367/13 |
| 2018/0362024 A1* | 12/2018 | Ernesti | ............... | G01B 21/22 |

FOREIGN PATENT DOCUMENTS

| | | |
|---|---|---|
| JP | 2008-309512 A | 12/2008 |
| JP | 2014-089071 A | 5/2014 |

\* cited by examiner

OBJECT DETECTION APPARATUS AND OBJECT DETECTING METHOD

CROSS-REFERENCE TO RELATED APPLICATION

This application is based on and claims the benefit of priority from PCT Application No. PCT/JP2016/084376, filed on Nov. 21, 2016, and Japanese Patent Application No. 2015-229149, filed on Nov. 24, 2015, the disclosures of which are incorporated herein by reference.

TECHNICAL FIELD

The present disclosure relates to an object detection apparatus and an object detecting method that detect an object present around a subject vehicle based on transmission and reception of ultrasonic waves by an ultrasonic sensor.

BACKGROUND ART

Conventionally, an object detection apparatus is known which allows transmitted waves to be transmitted from an ultrasonic sensor, and in a case of receiving reflected waves from the object as received waves, detects an object present around a subject vehicle based on the received waves. In such an apparatus, a reception sensitivity for received waves received by the ultrasonic sensor varies caused by outside air temperature. Thus, PTL 1 proposes suppression of a variation in object detection accuracy caused by outside air temperature by correcting the reception sensitivity of the ultrasonic sensor based on a detected value of the outside air temperature detected by an outside air temperature sensor.

CITATION LIST

Patent Literature

[PTL 1] JP 2014-89071 A

SUMMARY OF THE INVENTION

Technical Problem

A transmission intensity for transmitted waves from the ultrasonic sensor and the reception sensitivity for received waves received by the ultrasonic sensor vary caused by temperature of the ultrasonic sensor itself, thus affecting the object detection accuracy. However, this is not taken into account in the related art.

An object of the present disclosure is to provide an object detection apparatus which can suppress a variation in object detection accuracy based on a temperature characteristic of the ultrasonic sensor.

Solution to Problem

An aspect of a technique of the present disclosure is an object detection apparatus (20) includes an object detecting unit. The object detecting unit detects an object present around a subject vehicle based on received waves in a case of receiving reflected waves, from the object, of ultrasonic waves transmitted from an ultrasonic sensor (10) as transmitted waves. The apparatus further includes a temperature detecting unit (13) and a correcting unit. The temperature detecting unit detects a temperature of the ultrasonic sensor. The correcting unit corrects at least one of a reception sensitivity for the received waves received by the ultrasonic sensor and a transmission intensity for the transmitted waves from the ultrasonic sensor based on a detected value of the temperature of the ultrasonic sensor detected by the temperature detecting unit. The object detecting unit detects the object using the received waves corrected by the correcting unit.

The object detection accuracy of the ultrasonic sensor varies caused by the temperature characteristic of the ultrasonic sensor. Thus, the object detection apparatus according to the aspect of the technique of the present disclosure detects the temperature of the ultrasonic sensor, and based on the detected value of the temperature, corrects at least one of the reception sensitivity for the received waves and the transmission intensity for the transmitted waves. As described above, the above-described object detection apparatus suppresses a variation in object detection accuracy caused by the temperature characteristic of the ultrasonic sensor.

DESCRIPTION OF THE EMBODIMENT

An embodiment in which an object detection apparatus corresponding to an aspect of a technique of the present disclosure is embodied will be described with reference to the drawings. In an example described in the present embodiment, the object detection apparatus is applied to a vehicle system which detects an object present around a subject vehicle based on transmission and reception of ultrasonic waves by an ultrasonic sensor mounted in the subject vehicle.

Figure 1:
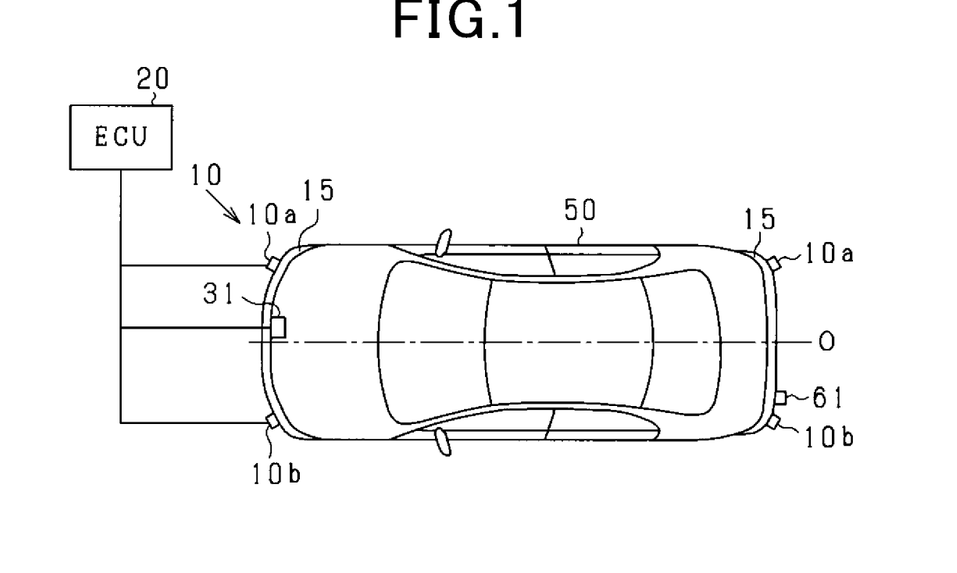
FIG. 1 is a top view illustrating a mounting position of an ultrasonic sensor.
Figure 2:
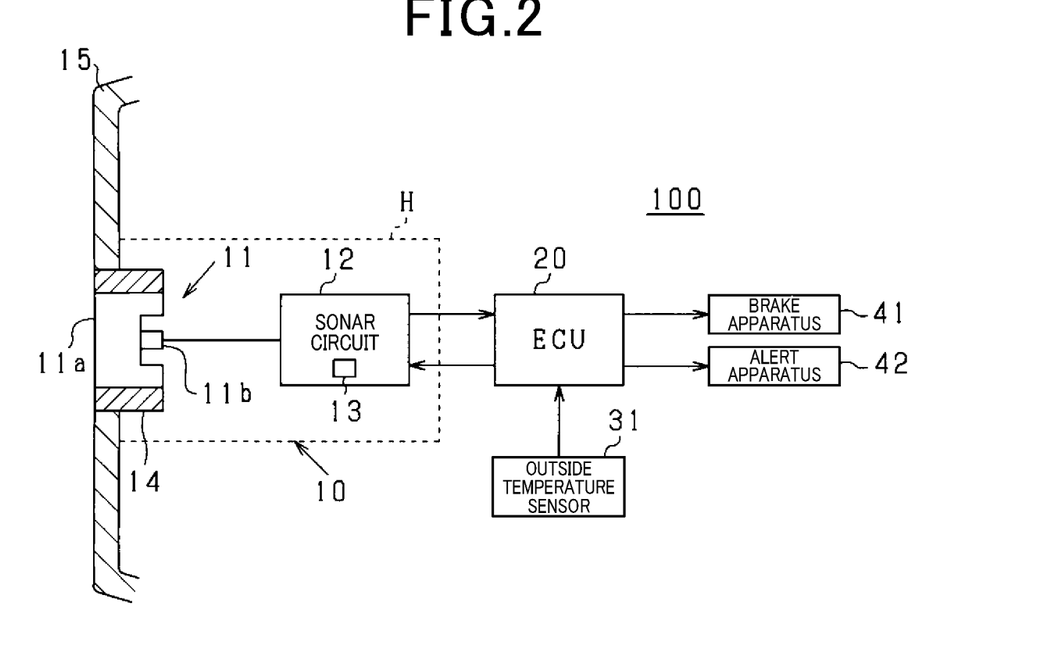
FIG. 2 is a schematic vertically sectional view of the ultrasonic sensor at the mounting position thereof.

As illustrated in FIG. 1 and FIG. 2, a vehicle system 100 mounted in a subject vehicle 50 includes ultrasonic sensors 10, an ECU 20, an outside air temperature sensor 31, a brake apparatus 41, and an alert apparatus 42. These components are connected together via electric signal lines so as to be able to communicate with one another.

Each of the ultrasonic sensors 10 transmits ultrasonic waves in a predetermined frequency band (for example, a range from 20 to 100 kHz) as transmitted waves. Furthermore, the ultrasonic sensor 10 receives reflected waves from an object as received waves.

As illustrated in FIG. 2, the ultrasonic sensor 10 includes a vibrator 11 accommodated in a housing H and a sonar circuit 12. The vibrator 11 is composed of a piezoelectric element 11b built into a resonator 11a formed of aluminum or the like.

The sonar circuit 12 is composed of a drive circuit which drives the piezoelectric element 11b, a receive circuit which receives ultrasonic waves to detect an object or calculate a distance, a communication circuit which communicates with the ECU 20, and the like. Furthermore, the sonar circuit 12 is provided with a temperature sensor 13 configured to detect a temperature in the housing H (sensor temperature corresponding to the temperature of the ultrasonic sensor 10). The temperature sensor 13 functions as a temperature detecting unit which detects the temperature of the ultrasonic sensor 10.

The ultrasonic sensors 10 are mounted on respective bumpers 15 at the front and rear of the vehicle. Specifically, each of the ultrasonic sensors 10 is embedded in a hole formed in the corresponding bumper 15, for example, via a cushion 14 formed of a rubber member. A surface of the resonator 11a of the vibrator 11 is exposed from a front surface of the bumper 15 to form a transmitting surface through which ultrasonic waves are transmitted. The transmitting surface of the resonator 11a is arranged, for example, in such a manner as to be flush with the front surface of the bumper 15. The ultrasonic sensor 10 may be embedded in a body of the subject vehicle 50 or a body exterior component instead of the bumper 15.

In the present embodiment, the bumpers 15 at the front and rear of the vehicle are provided with the respective ultrasonic sensors 10. In the example illustrated in FIG. 1, on the bumper 15 in the front of the vehicle, two ultrasonic sensors 10 (10a, 10b) are arranged away from each other and side by side at positions where the ultrasonic sensors 10 are laterally symmetric about a center line O. Similarly, on the bumper 15 at the rear of the vehicle, two ultrasonic sensors 10 (10a, 10b) are arranged away from each other and side by side at positions where the ultrasonic sensors 10 are laterally symmetric about the center line O. The number and the installation positions of the ultrasonic sensors 10 illustrated in FIG. 1 are illustrative. The number and the installation positions of the ultrasonic sensors 10 are not limited to those described above.

Figure 3:
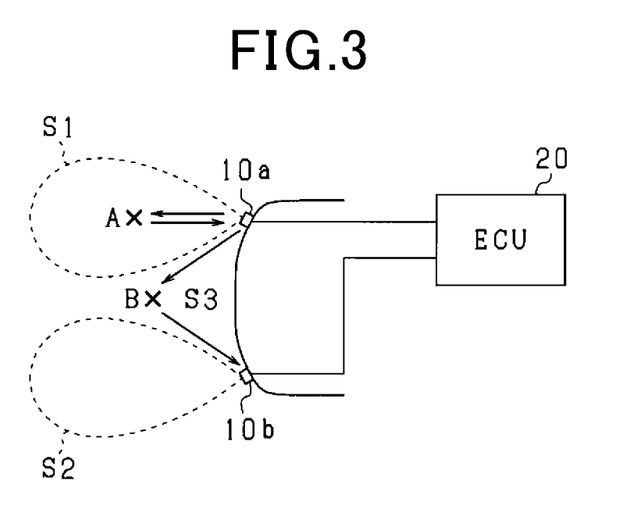
FIG. 3 is a diagram illustrating an object detection region of the ultrasonic sensor.

As illustrated in FIG. 3, different object detection regions S1 (first detection region) and S2 (second detection region) are specified for the respective ultrasonic sensors 10a (first sensor) and 10b (second sensor). The ultrasonic sensor 10a can receive transmitted waves transmitted from the sensor 10a as direct waves. The ultrasonic sensor 10a can also receive transmitted waves transmitted from the ultrasonic sensor 10b as indirect waves. Similarly, the ultrasonic sensor 10b can receive transmitted waves transmitted from the sensor 10b as the direct waves. The ultrasonic sensor 10b can also receive transmitted waves transmitted from the ultrasonic sensor 10a as the indirect waves.

By way of example, a case of transmission of the transmitted waves from the ultrasonic sensor 10a will be described. For example, if an object is present at a position A within the detection region S1 of the ultrasonic sensor 10a, the ultrasonic sensor 10a itself receives received waves as direct waves.

On the other hand, if the object is present at a position B within a detection region S3 located between the detection regions S1, S2 of the adjacent ultrasonic sensors 10a, 10b and where the transmitted waves from the ultrasonic sensor 10a can be received by the ultrasonic sensor 10b, the ultrasonic sensor 10b receives the received waves as indirect waves. The detection regions S1, S2 can be modified as necessary. For the detection regions S1, S2, for example, the adjacent detection regions may partly overlap each other.

The description returns to FIG. 1. In the front of the vehicle, the outside air temperature sensor 31 detecting the ambient temperature of the subject vehicle 50 is provided, for example, on an inner side of a lower portion of the bumper 15 which is unlikely to be affected by sunlight or the like. The outside air temperature sensor 31 functions as an outside temperature detecting unit which detects the outside air temperature (outside temperature). At the rear of the vehicle, a muffler 61 which discharges an exhaust gas to the outside is provided on one side with respect to the center line O.

In FIG. 2, the brake apparatus 41 is a braking apparatus which brakes the subject vehicle 50. In accordance with a control instruction from the ECU 20, the brake apparatus 41 increases a braking force of a braking operation performed by a driver (assists the braking operation) or performs automatic control regardless of whether or not the driver performs the braking operation.

The alert apparatus 42 outputs an alert message, an alert sound, or the like in accordance with a control instruction from the ECU 20, to alert the driver of the risk of a collision. Any safety apparatus may be provided so long as the safety apparatus includes at least one of the brake apparatus 41 and the alert apparatus 42.

The ECU 20 corresponds to an object detection apparatus according to the present embodiment. The ECU 20 is a computer including a CPU, a ROM, a RAM and an I/O unit. In the ECU 20, for example, the CPU executes programs stored in the ROM to realize various functions of the object detection apparatus according to the present embodiment.

Figure 4:
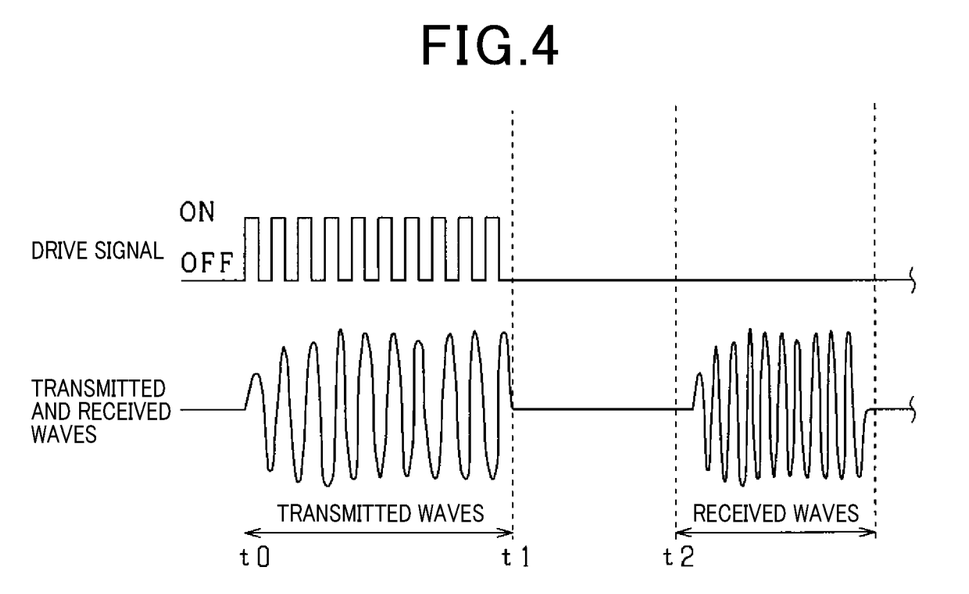
FIG. 4 is a timing chart of a drive signal for the ultrasonic sensor.

The ECU 20 detects the object using the direct waves or indirect waves received by the ultrasonic sensor 10. More specifically, as illustrated in FIG. 4, the ECU 20 provides a predetermined drive signal to the piezoelectric element 11b of the ultrasonic sensor 10 during time t0 through time t1. Consequently, during time t0 through time t1, the ultrasonic sensor 10 transmits ultrasonic waves with a predetermined frequency as transmitted waves. Subsequently, the transmitted waves are reflected by the object. As a result, a predetermined time later, in the ultrasonic sensor 10 (own sensor) which is the same as the sensor having transmitted the transmitted waves, the vibrator 11 of the sensor receives the received waves as direct waves. In the ultrasonic sensor 10 (another sensor) which is different from (adjacent to) the sensor having transmitted the transmitted waves, the vibrator 11 of the sensor receives the received waves as indirect waves.

Subsequently, at time t2, the received waves are input to the sonar circuit 12 of the ultrasonic sensor 10. The sonar circuit 12 executes a filtering process on the input received waves (direct waves or indirect waves). In the filtering process, noise components included in the received waves are removed by extracting signals in a predetermined frequency band.

Furthermore, the ECU 20 corrects at least one of a transmission intensity and a reception sensitivity of the ultrasonic sensor 10 based on a detected value of the outside air temperature (outside temperature) detected by the outside air temperature sensor 31. The likelihood of propagation (degree of attenuation) of ultrasonic waves through the air varies according to the outside air temperature. Thus, the transmission intensity for the ultrasonic waves transmitted from the ultrasonic sensor 10 and the reception sensitivity for the received waves received by the ultrasonic sensor 10 vary caused by the outside air temperature.

Figure 5:
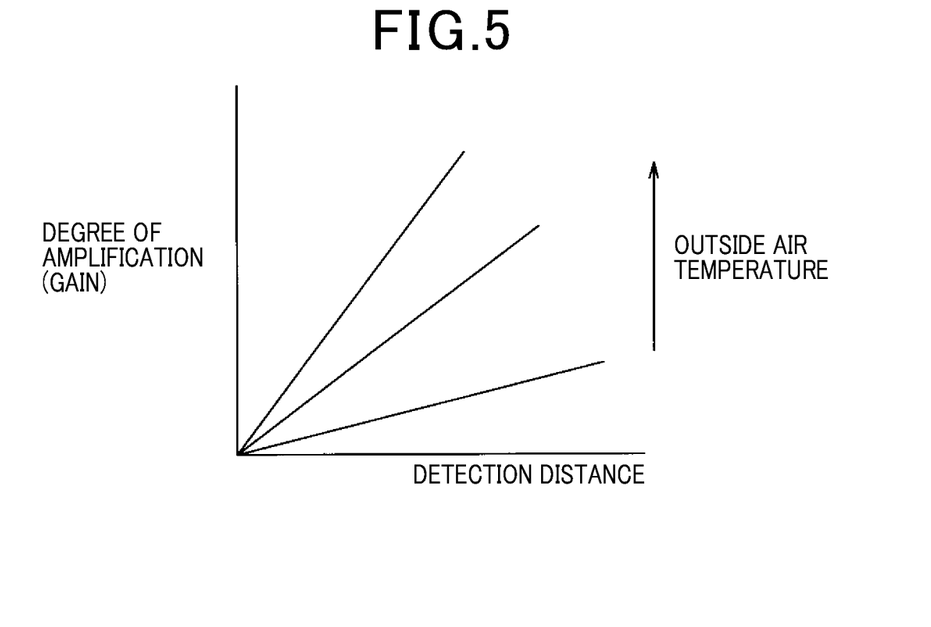
FIG. 5 is a map relating to correction based on an outside air temperature.

Thus, the ECU 20 according to the present embodiment corrects at least one of the transmission intensity and the reception sensitivity of the ultrasonic sensor 10 based on the outside air temperature using a map (map relating to correction) indicative of the correlation between an object detection distance and the degree of amplification (gain) illustrated in FIG. 5. FIG. 5 illustrates the correlation between the object detection distance and the degree of amplification of the amplitude of the ultrasonic waves at each outside air temperature. In the map, for example, the object detection distance and the degree of amplification (correction amount) are pre-associated with each other for each outside air temperature. The map illustrated in FIG. 5 is set in such a manner that the degree of amplification of the amplitude of the ultrasonic waves increases monotonically with a distance from the object. This is because the degree of attenuation of the ultrasonic waves increases monotonically with the distance from the object. The map as used herein refers to data which enables, through data association, determination of the degree of amplification based on the object detection distance. The data is pre-stored in a storage apparatus such as a ROM (predetermined storage area) which is provided in the ECU 20. By referencing such a map, the ECU 20 can correct the transmission intensity and the reception sensitivity of the ultrasonic sensor 10 based on the outside air temperature (functions as a second correcting unit).

Furthermore, the likelihood of vibration of the resonator 11a of the ultrasonic sensor 10 varies according to the sensor temperature of the ultrasonic sensor 10. Thus, the transmission intensity and the reception sensitivity for ultrasonic waves vary caused by the sensor temperature. Thus, the ECU 20 according to the present embodiment corrects at least one of the transmission intensity and the reception sensitivity of each ultrasonic sensor 10 based on the detected value of the sensor temperature of the ultrasonic sensor 10. The ECU 20 functions as a correcting unit which corrects at least one of the reception sensitivity for the received waves received by the ultrasonic sensor 10 and the transmission intensity for the transmitted waves from the ultrasonic sensor 10, based on the detected value of the temperature of the ultrasonic sensor 10.

Figure 6:
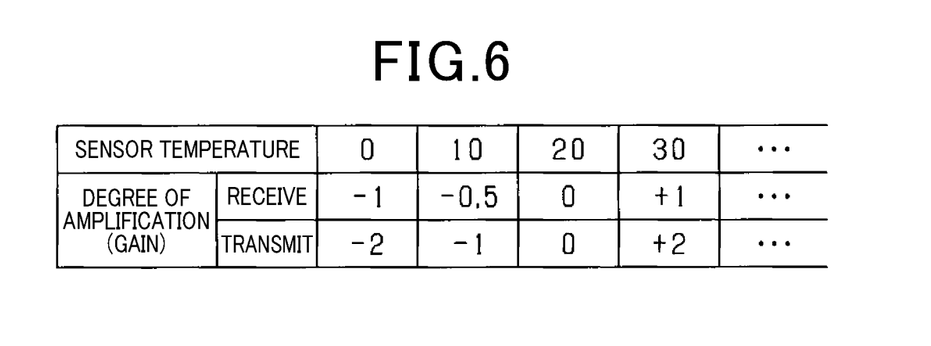
FIG. 6 is a map relating to correction based on a sensor temperature.

That is, the ECU 20 uses the map (map relating to correction) indicative of the correlation between the sensor temperature and the degree of amplification (gain) as illustrated in FIG. 6 to correct at least one of the transmission intensity and the reception sensitivity of the ultrasonic sensor 10 based on the sensor temperature. FIG. 6 indicates the correlation between the sensor temperature and the degree of amplification of the amplitude of ultrasonic waves (transmitted waves and received waves). In the map, for example, the sensor temperature and the degree of amplification (correction amount) are pre-associated with each other. In the map illustrated in FIG. 6, the degree of amplification is individually set for the transmitted waves (transmission intensity) and for the received waves (reception sensitivity). This is due to consideration of a difference between the effect of the sensor temperature on the transmission intensity and the effect of the sensor temperature on the reception sensitivity.

FIG. 6 also illustrates cases where the degree of amplification is set to a positive value and to a negative value depending on the sensor temperature. This allows the reception sensitivity to be adjusted to a value within a predetermined sensitivity range through correction. Thus, in the present embodiment, the object to be detected can be appropriately extracted by adjusting the reception sensitivity to a value within the predetermined sensitivity range. In other words, the present embodiment allows avoidance of problems such as unwanted activation of the safety apparatus resulting from erroneous detection of an object which is not the detection target. Similar to the map illustrated in FIG. 5, the map illustrated in FIG. 6 contains data which enables, through data association, determination of the degree of amplification based on the sensor temperature. By referencing such a map, the ECU 20 can correct the transmission intensity and the reception sensitivity of the ultrasonic sensor 10 based on the sensor temperature.

As described above, the ECU 20 according to the present embodiment uses the maps relating to correction in FIG. 5 and FIG. 6 to execute a combination of a correction process based on the outside air temperature and a correction process based on the sensor temperature. Consequently, the present embodiment suppresses a variation in object detection accuracy caused by the outside air temperature and the sensor temperature. The maps illustrated in FIG. 5 and FIG. 6 are examples only. The maps relating to correction may be set according to the characteristics of each ultrasonic sensor 10.

If the vehicle is equipped with a plurality of the ultrasonic sensors 10, the effect of heat on the ultrasonic sensor 10 varies among the ultrasonic sensors 10 due to different mounting positions thereof. In the example illustrated in FIG. 1, an ultrasonic sensor 10a is provided at a position relatively far from a muffler 61. On the other hand, an ultrasonic sensor 10b is provided at a position relatively close to the muffler 61. In such a case, the ultrasonic sensor 10b is likely to be thermally affected more than the ultrasonic sensor 10a. Thus, the ultrasonic sensor 10b tends to have a higher sensor temperature than the ultrasonic sensor 10a. Similarly, when the ultrasonic sensor 10 provided at the front of the vehicle is compared with the ultrasonic sensor 10 provided at the rear of the vehicle, the temperature may vary among the ultrasonic sensors 10 due to the mounting positions thereof, the effect of an external heat source, or the like.

Furthermore, if a plurality of ultrasonic sensors 10 is mounted side by side in the vehicle, the manner in which the object present around the subject vehicle 50 is detected varies according to the position of the object as described above. Specifically, the object may be detected using one ultrasonic sensor 10 or a plurality of adjacent ultrasonic sensors 10.

If the object is detected using one ultrasonic sensor 10, the sensor temperature of the ultrasonic sensor 10 transmitting and receiving ultrasonic waves affects both the transmission intensity and the reception sensitivity. On the other hand, if the object is detected using a plurality of the ultrasonic sensors 10, the temperature of the transmitting-side ultrasonic sensor 10 affects the transmission intensity, and the temperature of the receiving ultrasonic sensor 10 affects the reception sensitivity. If the object is detected using one ultrasonic sensor 10, the received waves are received as direct waves. On the other hand, if the object is detected using a plurality of the ultrasonic sensors 10, the received waves are received as indirect waves.

Thus, the ECU 20 according to the present embodiment determines whether the received waves are direct waves or indirect waves. Based on an instruction signal, the ECU 20 identifies the ultrasonic sensor 10 having transmitted the transmitted waves and the ultrasonic sensor 10 having received the received waves. Based on the identification results, the ECU 20 determines whether the received waves are direct waves or indirect waves. Specifically, the ECU 20 makes the determination by determining whether or not the transmitting-side ultrasonic sensor 10 is the same as the receiving-side ultrasonic sensor 10.

If the received waves are direct waves, the ECU 20 corrects both the transmission intensity and the reception sensitivity based on the one ultrasonic sensor 10 having transmitted and received the ultrasonic waves. On the other hand, if the received waves are indirect waves, the ECU 20 corrects the transmission intensity based on the sensor temperature of the transmitting-side ultrasonic sensor 10 and corrects the reception sensitivity based on the sensor temperature of the receiving-side ultrasonic sensor 10.

As described above, in the present embodiment, a variation in object detection accuracy caused by the sensor temperature is suppressed in both cases where the object is detected by way of the direct waves and where the object is detected by way of the indirect waves.

The ECU 20 executes a correction process based on the outside air temperature and the sensor temperature, and then compares the voltage level of the amplitude of the received waves resulting from the correction process with the voltage level of a predetermined threshold Th. As a result, if the amplitude of the received waves is larger than the predetermined threshold Th, the ECU 20 determines that the object has been detected to obtain detection information.

Furthermore, the sonar circuit 12 transmits a duration from the start of transmission of the ultrasonic waves until reception of the received waves, to the ECU 20. The ECU 20 calculates a distance from the subject vehicle 50 to the object through conversion of the duration. The sonar circuit 12 may convert the duration into the distance. Furthermore, in the example described in the present embodiment, one of the sonar circuit 12 and the ECU 20 executes various calculation processes described below. However, the technique of the present disclosure is not limited to this. Either of the sonar circuit 12 and the ECU 20 may execute the various calculation processes described below.

Subsequently, the ECU 20 performs driving support control on the subject vehicle 50 based on the object detection result. Specifically, the ECU 20 activates the safety apparatus in case of determining that the risk of a collision with the object has increased based on the acquired object detection information and the calculated distance to the object. For example, in a place such as a parking lot where the vehicle speed is low, the ECU 20 activates the safety apparatus if the object is detected within several meters from the subject vehicle 50, indicating an increased risk of a collision with the object.

In the vehicle system 100 according to the present embodiment, the above-described correction process continues to be executed while the ECU 20 is in a driving state. A timing to execute the correction process may be preset in such a manner that the ECU 20 repeatedly executes the process at predetermined intervals (with a predetermined period).

Now, a procedure for an object detecting process executed by the ECU 20 (object detection apparatus) according to the present embodiment will be described using a flowchart in FIG. 7. In the present embodiment, the following process is repeatedly executed by the ECU 20.

First, the ECU 20 acquires the outside air temperature (step S11). At this time, the ECU 20 acquires the detected value of the outside air temperature from the outside air temperature sensor 31. The ECU 20 then acquires the sensor temperature (step S12). At this time, the ECU 20 acquires the detected value (detected value from the temperature sensor 13) of the sensor temperature of each ultrasonic sensor 10 mounted in the subject vehicle 50. The ECU 20 then acquires a correction amount for the reception sensitivity based on the outside air temperature (step S13). In the present process, the correction amount for the reception sensitivity is acquired as follows. The ECU 20 references the data in the map illustrated in FIG. 5. Based on the outside air temperature acquired in the processing in step S11, the ECU 20 selects setting data indicative of the correlation between the object detection distance and the degree of amplification, which corresponds to the outside air temperature. Consequently, the ECU 20 determines, based on the setting data, the degree of amplification of the amplitude of the ultrasonic waves associated with the object detection distance, and acquires the determined degree of amplification as the correction amount for the reception sensitivity.

The ECU 20 then acquires a correction amount for the transmission intensity based on the sensor temperature (step S14). In the present process, the correction amount for the transmission intensity is acquired as follows. The ECU 20 references the data in the map illustrated in FIG. 6. Based on the sensor temperature acquired in the processing in step S12 (sensor temperature of the ultrasonic sensor 10 having transmitted the transmitted waves), the ECU 20 selects setting data indicative of the correlation between the sensor temperature and the degree of amplification. Consequently, the ECU 20 determines, based on the setting data, the degree of amplification of the amplitude of the transmitted waves associated with the sensor temperature, and acquires the determined degree of amplification as the correction amount for the transmission intensity. The ECU 20 then determines whether or not the received waves are the direct waves (step S15). In a case of determining that the received waves are the direct waves (step S15: YES), the ECU 20 references the data in the map illustrated in FIG. 6 to acquire the correction amount for the reception sensitivity based on the sensor temperature of the ultrasonic sensor 10 having transmitted the transmitted waves (transmitting-side sensor temperature) (step S16). At this time, the ECU 20 determines, based on the setting data, the degree of amplification of the amplitude of the received waves associated with the sensor temperature, and acquires the determined degree of amplification as the correction amount for the reception sensitivity.

In case of determining that the received waves are not the direct waves but the indirect waves (step S15, NO), the ECU 20 acquires the correction amount for the reception sensitivity based on the sensor temperature of the ultrasonic sensor 10 having received the received waves (receiving-side temperature) (step S17).

The ECU 20 then corrects the transmission intensity and the reception sensitivity of the ultrasonic sensor 10 using the correction amounts acquired in the above-described processing (step S18). In the present process, the ECU 20 corrects the transmission intensity of the ultrasonic sensor 10 using the correction amount for the transmission intensity acquired in the processing in step S14. The ECU 20 further corrects the reception sensitivity of the ultrasonic sensor 10 using the correction amount for the reception sensitivity acquired in the processing in step S13 and the correction amount for the reception sensitivity acquired in the processing in step S16 or step S17. The ECU 20 subsequently determines whether or not the amplitude of the corrected received waves is larger than the predetermined threshold Th (step S19). In a case of determining that the amplitude of the received waves is larger than the predetermined threshold Th (step S19: YES), the ECU 20 determines that the object is present in front of the subject vehicle 50 (step S20). In a case of determining that the amplitude of the received waves is equal to or smaller than the predetermined threshold Th (step S19: NO), the ECU 20 determines that the object is not present in front of the subject vehicle 50 (step S21). In a case of determining that the object is present in front of the subject vehicle 50, the ECU 20 calculates the distance from the subject vehicle 50 to the object (step S22). At this time, the ECU 20 converts the duration received from the sonar circuit 12 to calculate the distance from the subject vehicle 50 to the object.

As described above, the object detection apparatus (ECU 20) according to the present embodiment can produce the following excellent effects.

(1) The object detection accuracy of the ultrasonic sensor 10 varies caused by a temperature characteristic of the ultrasonic sensor 10. Thus, the object detection apparatus according to the present embodiment detects the sensor temperature of the ultrasonic sensor 10, and based on the detected value of the sensor temperature, corrects at least one of the reception sensitivity for the received waves and the transmission intensity for the transmitted waves. Consequently, the object detection apparatus according to the present embodiment suppresses a variation in object detection accuracy caused by the temperature characteristic of the ultrasonic sensor 10.

(2) If the subject vehicle 50 is provided with a plurality of ultrasonic sensors 10, the sensor temperature varies among the ultrasonic sensors 10 due to the different mounting positions thereof. Furthermore, the temperature characteristic is expected to vary among the ultrasonic sensors 10. Moreover, if a plurality of the ultrasonic sensors 10 is provided side by side, the received waves are detected as the indirect waves, by the ultrasonic sensor 10 different from the ultrasonic sensor 10 having transmitted the transmitted waves (transmitting-side sensor).

Thus, in a case of receiving the indirect waves, the object detection apparatus according to the present embodiment corrects the reception sensitivity of the ultrasonic sensor 10 having received the indirect waves based on the detected value of the sensor temperature of the ultrasonic sensor 10 having received the indirect waves. Consequently, in the object detection apparatus according to the present embodiment, if different ultrasonic sensors 10 are used on the transmitting and receiving sides, respectively, the effect of the receiving-side sensor temperature on the reception sensitivity is eliminated. As a result, in the object detection apparatus according to the present embodiment, a variation in object detection accuracy caused by the sensor temperature is suppressed in a case where the object is detected using a plurality of the ultrasonic sensors 10.

(3) In the object detection apparatus according to the present embodiment, if the direct waves are received, the reception sensitivity of the ultrasonic sensor 10 having received the direct waves is corrected based on the detected value of the sensor temperature of the ultrasonic sensor 10 having received the direct waves. Consequently, in the object detection apparatus according to the present embodiment, if the object is detected using one ultrasonic sensor 10, the effect of the sensor temperature of the ultrasonic sensor 10 on the reception sensitivity is eliminated. As a result, in the object detection apparatus according to the present embodiment, a variation in object detection accuracy caused by the sensor temperature is suppressed in a case where the object is detected using one ultrasonic sensor 10.

(4) In the object detection apparatus according to the present embodiment, the transmission intensity of the ultrasonic sensor 10 having transmitted the transmitted waves is corrected based on the detected value of the sensor temperature of the ultrasonic sensor 10 having transmitted the transmitted waves. Consequently, the object detection apparatus according to the present embodiment suppresses a variation in transmission intensity caused by the sensor temperature of the ultrasonic sensor 10.

(5) In the object detection apparatus according to the present embodiment, if the object is detected by way of the indirect waves (if the received waves are the indirect waves), the reception sensitivity is corrected based on the detected value of the sensor temperature of the ultrasonic sensor 10 having received the received waves. Furthermore, the object detection apparatus corrects the transmission intensity based on the detected value of the sensor temperature of the ultrasonic sensor 10 having transmitted the transmitted waves. On the other hand, if the object is detected by way of the direct waves (if the received waves are the direct waves), both the reception sensitivity and the transmission intensity are corrected based on the detected value of the sensor temperature of the ultrasonic sensor 10 having transmitted the transmitted waves. As described above, in the object detection apparatus according to the present embodiment, the correction process for the transmission intensity and the reception sensitivity is switched depending on whether the object is detected by way of the indirect waves or the direct waves (whether the received waves are the indirect waves or the direct waves). Consequently, in the object detection apparatus according to the present embodiment, a variation in object detection accuracy caused by the sensor temperature of the ultrasonic sensor 10 is suppressed in both cases where the object is detected using one ultrasonic sensor 10 and where the object is detected using a plurality of ultrasonic sensors 10.

(6) For example, if the ultrasonic sensors 10a, 10b are provided side by side, and the object detection regions S1, S2 are specified for the ultrasonic sensors 10a, 10b, respectively, as illustrated in FIG. 3, the object can be detected as follows. If the object is present within one of the detection regions S1, S2, the object can be detected using the direct waves. On the other hand, if the object is present within the detection region S3 between the detection regions S1 and S2, the object can be detected using the indirect waves.

(7) In the object detection apparatus according to the present embodiment, for the ultrasonic sensor 10a transmitting the transmitted waves, the transmission intensity is corrected based on the detected value of the sensor temperature of the ultrasonic sensor 10a. On the other hand, for the ultrasonic sensor 10b receiving the received waves, the reception sensitivity is corrected based on the detected value of the sensor temperature of the ultrasonic sensor 10b. Consequently, in the object detection apparatus according to the present embodiment, the effect of the sensor temperature is eliminated in each of the transmitting-side ultrasonic sensor 10a and the receiving-side ultrasonic sensor 10b. As a result, in the object detection apparatus according to the present embodiment, a variation in object detection accuracy caused by the sensor temperature is suppressed in a case where the object is detected using the ultrasonic sensors 10a, 10b (a plurality of the ultrasonic sensors 10).

(8) If the object is detected by way of the direct waves, both the reception sensitivity and the transmission intensity are corrected based on the sensor temperature of the ultrasonic sensor 10 having received the direct waves. Consequently, the object detection apparatus according to the present embodiment suppresses a variation in object detection accuracy caused by the sensor temperature of the ultrasonic sensor 10.

(9) In the object detection apparatus according to the present embodiment, the reception sensitivity of the ultrasonic sensor 10 is corrected to a value within the predetermined sensitivity range. Consequently, the object detection apparatus according to the present embodiment can appropriately detect the object to be detected.

(10) In the object detection apparatus according to the present embodiment, whether or not the object is present can be determined based on the condition that the amplitude of the corrected received waves is larger than the predetermined threshold Th. In other words, the object detection apparatus according to the present embodiment can determine whether or not the object is present by using the amplitude of the corrected received waves as a determination parameter.

(11) The object detection accuracy of the ultrasonic sensor 10 varies caused by the outside air temperature (outside temperature). Thus, the object detection apparatus according to the present embodiment detects the outside air temperature, and based on the detected value thereof, corrects both the reception sensitivity and the transmission intensity of the ultrasonic sensor 10. Consequently, the object detection apparatus according to the present embodiment suppresses a variation in object detection accuracy caused by the outside air temperature.

The above-described embodiment may be modified, for example, as described below. In the following description, components similar to the corresponding components described above in the embodiment are denoted by the same reference numerals, and detailed description thereof is omitted.

In the example illustrated in the above-described embodiment, the degree of amplification (gain) of the amplitude of the transmitted waves is acquired based on the sensor temperature, using the map illustrated in FIG. 6, and the transmission intensity is corrected based on the acquired degree of amplification (correction amount). However, the technique of the present disclosure is not limited to this. An alternative method may be to correct the transmission intensity by adjusting the power of the transmitted waves of the ultrasonic sensor 10 based on the sensor temperature. Another example of alternative method is to adjust the power of the transmitted waves of the ultrasonic sensor 10 by varying at least one of current, voltage, and pulse number when the piezoelectric element 11b is vibrated, based on the sensor temperature. As described above, the object detection apparatus also suppresses variation in transmission intensity caused by the sensor temperature of the ultrasonic sensor 10 by performing adjustment of the power of the transmitted waves from the ultrasonic sensor 10 as a correction process for the transmission intensity.

In the configuration example described above in the embodiment, the ultrasonic sensor 10 includes the built-in temperature sensor 13 configured to detect the sensor temperature of the ultrasonic sensor 10, to internally detect the sensor temperature. However, the technique of the present disclosure is not limited to this. The sensor temperature of the ultrasonic sensor 10 may be externally detected.

At least one of the reception sensitivity and the transmission intensity is expected to be not affected by the sensor temperature depending on the type of the ultrasonic sensor 10. Thus, the ECU 20 may execute the correction process on at least one of the reception sensitivity and the transmission intensity. If the correction process is executed only on the reception sensitivity, for example, the following processing is possible. In the flowchart illustrated in FIG. 7, described above, the ECU 20 omits the processing in step S14. The ECU 20 then executes the correction process on the reception sensitivity depending on whether the received waves are the direct waves or the indirect waves. In this manner, the object detection apparatus eliminates the effect, on the reception sensitivity, of the sensor temperature of the ultrasonic sensor 10 having received the received waves even if the correction process is executed only on the reception sensitivity. As a result, the object detection apparatus suppresses a variation in object detection accuracy caused by the sensor temperature.

Figure 7:
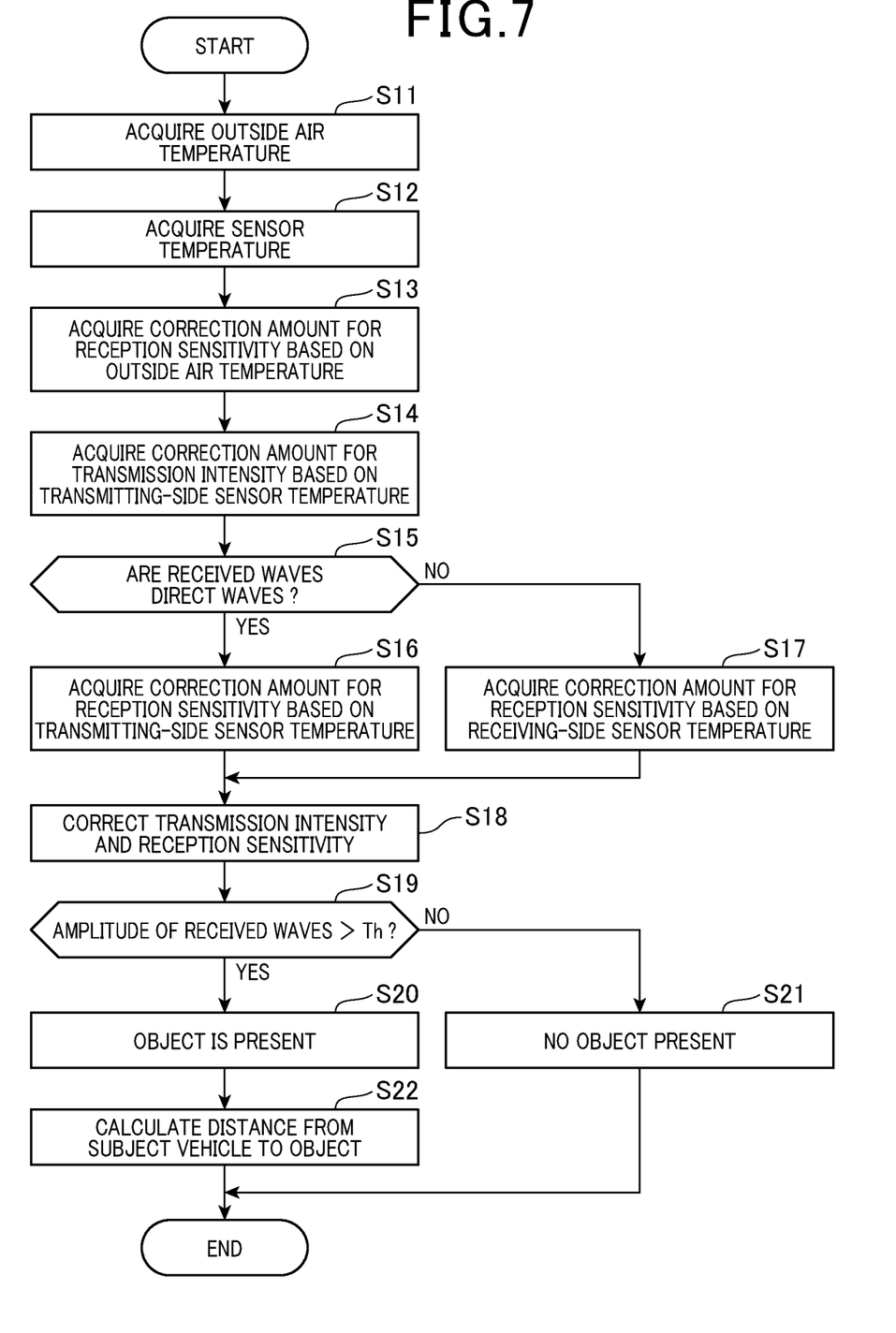
FIG. 7 is a flowchart illustrating a procedure for an object detecting process.

In another example, the ECU 20 may omit the processing in steps S11, S13 from the flowchart illustrated in FIG. 7, described above. That is, the correction process based on the outside air temperature may be omitted. In this case, the transmission intensity and the reception sensitivity are corrected using only the sensor temperature. Consequently, the object detection apparatus suppresses a variation in object detection accuracy caused by the sensor temperature.

In the example illustrated in the above-described embodiment, whether or not the object is present is determined by comparing the amplitude of the corrected received waves with the threshold Th. However, the technique of the present disclosure is not limited to this. An alternative method may be to determine whether or not the object is present based on the absolute value of the amplitude of the corrected received waves.

For the detection regions illustrated in FIG. 3, described above, the object detection region S1 of the ultrasonic sensor 10a and the object detection region S2 of the ultrasonic sensor 10b may partly overlap.

For the detection regions illustrated in FIG. 3, described above, different detection regions may not necessarily be set for the respective ultrasonic sensors 10. Also in this case, the ECU 20 determines whether or not the ultrasonic sensor 10 having transmitted the transmitted waves is the same as the ultrasonic sensor 10 having received the received waves. Consequently, the object detection apparatus can determine whether the received waves are the direct waves or the indirect waves.

REFERENCE SIGNS LIST

10 . . . Ultrasonic sensor, 13 . . . Temperature sensor, 20 . . . ECU

The invention claimed is:

1. An object detection apparatus including an object detecting unit detecting an object present around a subject vehicle based on received waves, in a case of receiving reflected waves, from the object, of ultrasonic waves transmitted from an ultrasonic sensor as transmitted waves, which is applied to a vehicle including a plurality of ultrasonic sensors arranged side by side, the object detection apparatus comprising:

a temperature detecting unit detecting a temperature of the ultrasonic sensor; and a correcting unit correcting at least one of a reception sensitivity for the received waves received by the ultrasonic sensor and a transmission intensity for the transmitted waves from the ultrasonic sensor based on a detected value of the temperature of the ultrasonic sensor detected by the temperature detecting unit, wherein:

the object detecting unit detects the object using indirect waves, which are the received waves received by an ultrasonic sensor different from the ultrasonic sensor having transmitted the transmitted waves, and detects the object using direct waves, which are the received waves received by a same ultrasonic sensor as the ultrasonic sensor having transmitted the transmitted waves, the object detecting unit includes a determining unit determining whether the received waves are the direct waves or the indirect waves, and the correcting unit:
- corrects the reception sensitivity of the ultrasonic sensor having received the indirect wave based on the detected value of the temperature of the ultrasonic sensor having received the indirect waves and corrects the transmission intensity of the ultrasonic sensor having transmitted the transmitted waves based on the detected value of the temperature of the ultrasonic sensor having transmitted the transmitted waves, in response to determining the received waves to be the indirect waves by the determining unit, and
- corrects both the reception sensitivity and the transmission intensity of the ultrasonic sensor having received the direct waves based on the detected value of the temperature of the ultrasonic sensor having received the direct waves in response to determining the received waves to be the direct waves by the determining unit.

2. The object detection apparatus according to claim 1, wherein the object detecting unit detects the object using indirect waves which are the received waves received by the ultrasonic sensor different from the ultrasonic sensor having transmitted the transmitted waves, and the correcting unit corrects the reception sensitivity of the ultrasonic sensor having received the indirect wave based on the detected value of the temperature of the ultrasonic sensor having received the indirect waves.

3. The object detection apparatus according to claim 1, wherein the object detecting unit detects the object using direct waves which are the received waves received by the same ultrasonic sensor as the ultrasonic sensor having transmitted the transmitted waves, and the correcting unit corrects the reception sensitivity of the ultrasonic sensor having received the direct waves based on the detected value of the temperature of the ultrasonic sensor having received the direct waves.

4. The object detection apparatus according to claim 1, wherein the correcting unit corrects the transmission intensity for the transmitted waves based on the detected value of the temperature of the ultrasonic sensor having transmitted the transmitted waves.

5. The object detection apparatus according to claim 1, comprising, as the plurality of the ultrasonic sensors, a first sensor detecting the object within a first detection region that is predetermined and a second sensor detecting the object within a second detection region that is predetermined, and
wherein the object detecting unit detects the object using the direct waves in a case where the object is present within one of the first detection region and the second detection region, and
detects the object using the indirect waves in a case where the object is present between the first detection region and the second detection region.

6. The object detection apparatus according to claim 5, wherein the temperature detecting unit detects a temperature of the first sensor as a first temperature and detects a temperature of the second sensor as a second temperature, and
the correcting unit corrects a transmission intensity of the first sensor based on a detected value of the first temperature and corrects a reception sensitivity of the second sensor based on a detected value of the second temperature, in a case where the transmitted waves transmitted from the first sensor is received as the indirect waves by the second sensor.

7. The object detection apparatus according to claim 5, wherein the correcting unit corrects, under a condition that the direct waves have been received, both the reception sensitivity and the transmission intensity of the ultrasonic sensor having received the direct waves.

8. The object detection apparatus according to claim 1, wherein the correcting unit corrects at least one of a degree of amplification of the transmitted waves and power of the transmitted waves as the transmission intensity for the transmitted waves from the ultrasonic sensor.

9. The object detection apparatus according to claim 1, wherein the correcting unit corrects the reception sensitivity for the received waves received by the ultrasonic sensor to a value within a predetermined sensitivity range.

10. The object detection apparatus according to claim 1, wherein the object detecting unit determines whether or not the object is present based on a condition that an amplitude of the corrected received waves is larger than a predetermined threshold.

11. The object detection apparatus according to claim 1, comprising:
- an outside temperature detecting unit detecting an outside temperature of the ultrasonic sensor; and
- a second correcting unit correcting the reception sensitivity and the transmission intensity of the ultrasonic sensor using the outside temperature detected by the outside temperature detecting unit.

12. An object detecting method applied to an object detection apparatus including an object detecting unit detecting an object present around a subject vehicle based on received waves, in a case of receiving reflected waves resulting, from the object, of ultrasonic waves transmitted from an ultrasonic sensor as transmitted waves, which is applied to a vehicle including a plurality of ultrasonic sensors arranged side by side, the object detecting method comprising the steps of:
- detecting a temperature of the ultrasonic sensor;
- correcting at least one of a reception sensitivity for the received waves received by the ultrasonic sensor and a transmission intensity for the transmitted waves from the ultrasonic sensor based on a detected value of the temperature of the ultrasonic sensor;
- detecting the object using indirect waves, which are the received waves received by an ultrasonic sensor different from the ultrasonic sensor having transmitted the transmitted wave, and detecting the object using direct waves, which are the received waves received by a same ultrasonic sensor as the ultrasonic sensor having transmitted the transmitted waves;
- determining whether the received waves are the direct waves or the indirect waves;
- correcting the reception sensitivity of the ultrasonic sensor having received the indirect wave based on the detected value of the temperature of the ultrasonic sensor having received the indirect waves and correcting the transmission intensity of the ultrasonic sensor having transmitted the transmitted waves based on the detected value of the temperature of the ultrasonic sensor having transmitted the transmitted waves, in response to determining the received waves to be the indirect waves; and
- correcting both the reception sensitivity and the transmission intensity of the ultrasonic sensor having received the direct waves based on the detected value of the temperature of the ultrasonic sensor having received the direct waves in response to determining the received waves to be the direct waves.

* * * * *